April 7, 1925.                                                                 1,532,347
L. R. RUTHENBURG
LOCK FOR IGNITION SYSTEMS AND STEERING WHEELS
Filed Feb. 23, 1923        2 Sheets-Sheet 1
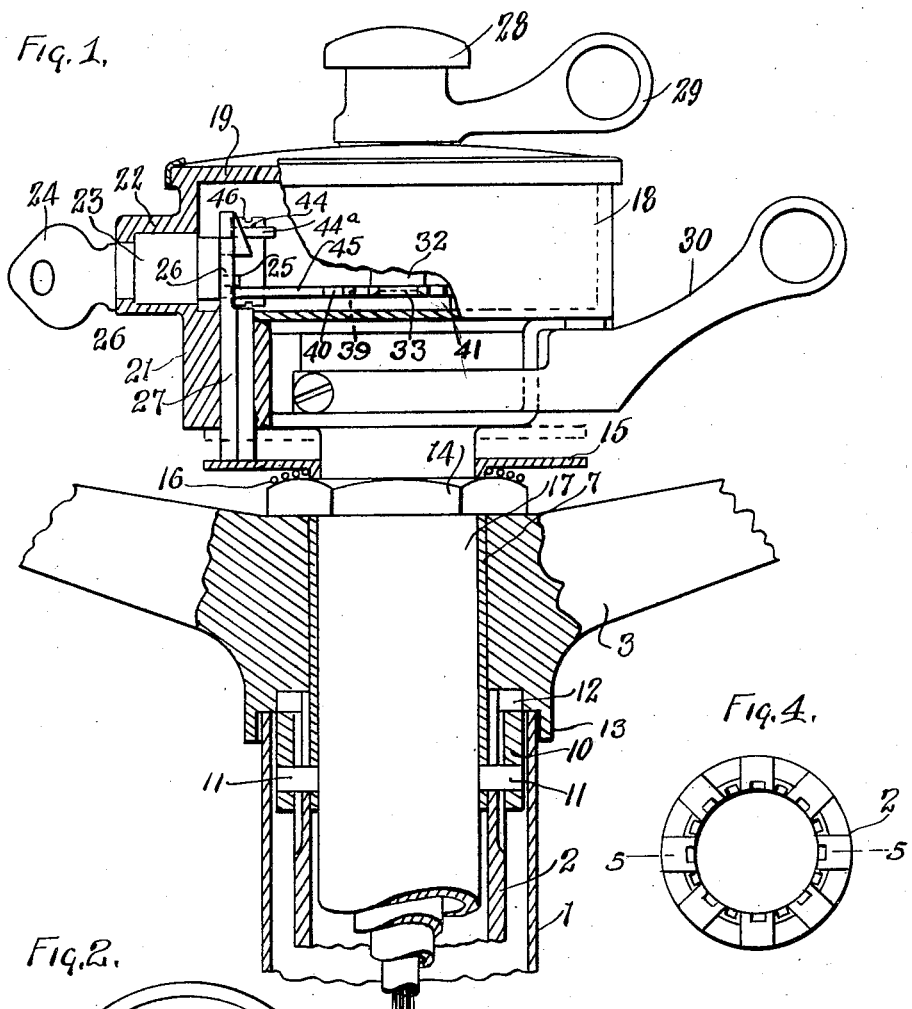
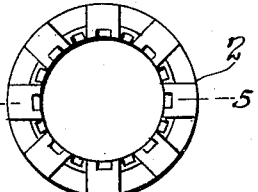
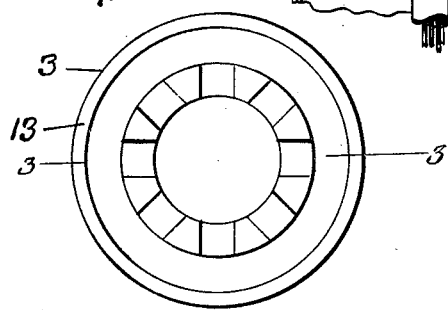
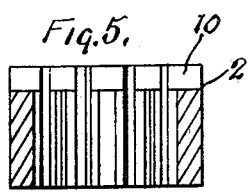
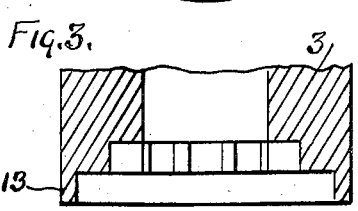
Inventor
Louis R. Ruthenburg,
By Taulmin & Taulmin,
Attorneys

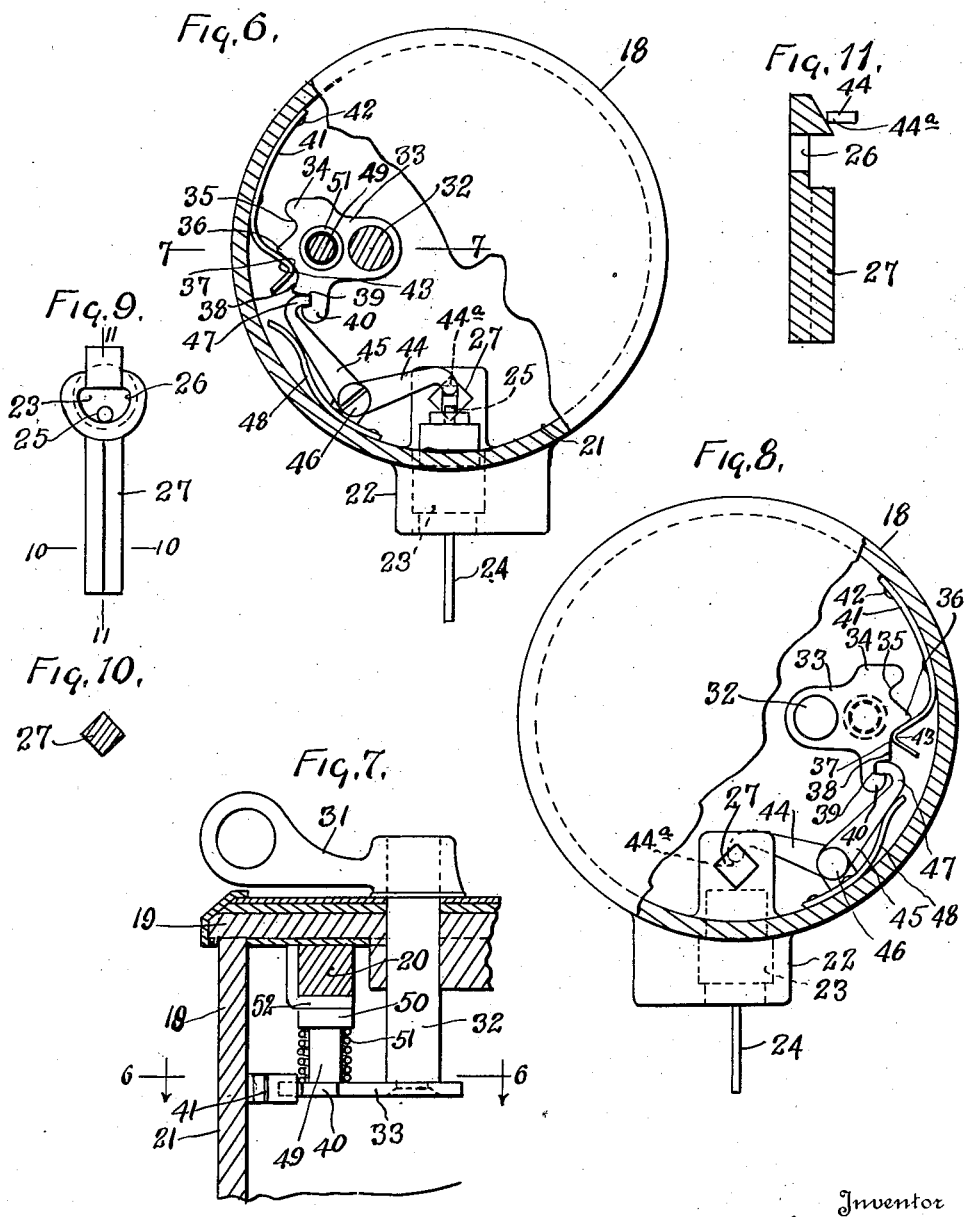

Patented Apr. 7, 1925.

1,532,347

UNITED STATES PATENT OFFICE.

LOUIS R. RUTHENBURG, OF DAYTON, OHIO.

LOCK FOR IGNITION SYSTEMS AND STEERING WHEELS.

Application filed February 23, 1923. Serial No. 620,795.

*To all whom it may concern:*

Be it known that I, LOUIS R. RUTHENBURG, a citizen of the United States, residing at Dayton, in the county of Montgomery, and State of Ohio, have invented certain new and useful Improvements in Locks for Ignition Systems and Steering Wheels, of which the following is a specification, reference being had therein to the accompanying drawing.

My invention relates to locks, in particular to locks for ignition systems and steering wheels of automobiles.

It is the object of my invention to provide a single lock to lock the steering wheel of the vehicle and also lock the ignition system.

It is the object of my invention to provide a lock located above the steering wheel and in particular, to have the lock located in the housing forming the control box for the ignition, lights, gas and spark controls.

It is the further object of my invention to provide a lock which will lock the steering wheel and simultaneously place the locking member in position to lock the ignition when the ignition is turned to its off position. This enables the steering wheel to be locked while the ignition is still on and upon moving the ignition to its off position to have it locked. This is a matter of considerable convenience when, at times, the operator happens to lock the steering wheel before he turns off the ignition.

It is the further object to provide a single key for thus controlling both the locking of the steering wheel, and the locking of the ignition.

It is the further object to provide such a construction that will be rigid, strong and of such a character that it cannot be tampered with by those desiring to unlock the vehicle who are not authorized to do so. Such arrangements place all the controls of manual character, save the gear shift and brake levers above the steering wheel in their most accessible position, eliminating the great inconvenience of reaching to various points on the dashboard to manipulate such controls, which has been the practice heretofore.

Referring to the drawings, Figure 1 is a side elevation partially in section of the complete assembly.

Figure 2 is a plan view of the locking teeth on the steering wheel. Fig. 3 is a section on the line 3—3 of Figure 2; and Figure 4 is a plan view of the head of the steering tube.

Figure 5 is a section on the line 5—5 of Figure 4. Figure 6 is a section on the line 6—6 of Figure 7. Figure 7 is a section on the line 7—7 of Figure 6 and Figure 8 is a bottom plan view of Figure 7.

Fig. 9 is a detail of the locking plunger.

Fig. 10 is a section on the line 10—10 of Fig. 9.

Fig. 11 is a section on the line 11—11 of Fig. 9.

Referring to the drawings in detail, 1 is a casing for the steering column in which there is also a concentric tubular member 2 which constitutes the steering tube and during driving operations is connected to the steering wheel 3.

The hub or spider 3 of the steering wheel is adapted to turn freely upon upper portion of steering tube 7 except when it is attached thereto by means of sliding tubular clutch member 10, projections or teeth 12 in said clutch member engaging with corresponding depressions in the lower part of hub 3.

These fingers 10 in the uppermost position are adapted to fit into the recesses 12 in the hub of the steering wheel 3. The steering wheel is provided with an overlapping shoulder 13 which overlaps upon the outside casing 1.

The actuating sliding tube 7 passes upwardly within the nut 14 and turns outwardly above the nut in a flaring skirt or flange 15. Beneath this flange 15 and above the nut is a spring 16 whose normal tendency is to force the tube and flange upwardly.

Passing through the nut 14 and mounted within the tube 7 is a stationary tubular member 17 which supports the control box 18, the details of which are set forth in my pending application No. 602,309 filed Nov. 20, 1922.

This control box is provided with a top 19 from which is suspended an insulating ring 20 upon which are mounted various contact members for the lights and ignition. The box is also provided with a side wall 21. In this side wall is provided a projecting housing 22 for the locking member 23 which is adapted to be actuated by a key 24. This locking member carries the locking finger 25 which fits in an eye 26 of the locking plunger 27 which is carried by the guide into the control box casing. The locking plunger is preferably of rectangular or flatted section to prevent its revolving within the casing. This locking plunger engages the top of the flange 15 of the tube 7 so that when it is in its locked position the plunger 27 depresses the tube 7 which in turn carries with it the arms or pins 11 and the tubular clutch member 10, unlocking the steering wheel 3 and permitting it to move freely. This movement of the tube 7 is against the resistance of the spring 16.

In Figure 1 will be seen the other portions of such control box such as the horn button 28, the lever 29 for controlling the lights and one of the spark or gas controls 30.

Referring to Figures 6, 7, and 8 in particular, there will be seen that on the top of the control box there is mounted an ignition lever 31 on ignition lever shaft 32 which projects inwardly into the interior of the box and has suspended on its lower end at right angles thereto the plate 33. This plate is provided with a shoulder 34, a depression 35, a shoulder 36, a depression 37, a shoulder 38 and a locking depression 39 and a shoulder 40.

The positioning or detent spring 41 is carried on the interior of the side wall 21 of the box by screws or rivets 42. Its free end is bent inwardly and outwardly upon the portion 43 which engages successively in the depressions 35 and 37 which are separated by a shoulder 36. The position of the spring, and parts, shown in Figure 6, is the position when the ignition is off, while when the parts are in such position the portion 43 of the spring 41 is in depression 35, the ignition is on.

It will be noted that a bell crank composed of arms 44 and 45 is suspended on a bolt 46 mounted on the casing. This bell crank has a locking head 47 for engaging with the locking recess 39 in the plate 33. It is impelled to such a locking position by the spring 48 which is also attached to the side wall of the box. The arm 44 of the bell crank is provided with a head 44ª which engages with the end of the locking finger 27 of the locking member 23.

When the key is turned to locking position, depressing the plunger 27, 45 is relieved of the pressure of 25 permitting the spring 48 to force the head 47 of the arm 45 into locking position in the plate 33, so that 47 engages in the recess 39, or if the plate 33 is not in the off position for the ignition, then 47 is placed in such a position that it will ride upon the end 40 of 33 and will snap into position as soon as the ignition is turned off.

Thus it is possible through a single key located in the control box above the steering wheel to unlock the steering wheel so that it will turn freely and not operate the steering mechanism of the car and also to lock the ignition so that the motor will not function. Thus by a single key I provide dual advantages of locked ignition and unlocked steering mechanism completely throwing the car out of operation.

Referring to Figure 7 it will be observed that 33 carries a vertical member 49 which in turn carries a contact member 50 pressed outwardly by a spring 51 against a contact member 52 carried by the ring 20. This insures a constant contact in a positive manner.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a steering wheel mechanism, an ignition control system, and means of rendering inoperative the steering mechanism and the ignition control system, said means having its manually actuated portions located above the steering wheel composing a part of the steering mechanism.

2. In combination, a steering wheel mechanism, an ignition control system, and means of simultaneously and by the same agency rendering inoperative the steering mechanism and the ignition control system, said means having its manually actuated portions located above the steering wheel composing a part of the steering mechanism.

3. In combination, a steering wheel mechanism, an ignition control system, and means of simultaneously rendering inoperative the steering mechanism and the ignition control system, said means having its manually actuated portion located above the steering wheel composing a part of the steering mechanism.

4. In combination, a steering wheel and steering column, means associated with the column beneath the steering wheel for locking and unlocking said steering column to said steering wheel, a casing for sealing said means and means above said steering wheel for locking or unlocking said means in its respective positions.

5. In combination, a steering wheel and steering column, a casing enclosing said column and adapted to support the steering wheel freely, means associated with the column for locking and unlocking said steering column to said steering wheel and concealed by said casing and means above said steering wheel for locking or unlocking said means in its respective positions.

6. In combination, a steering wheel, and steering column, a casing enclosing said column and adapted to support the steering wheel freely, means on the interior thereof for locking and unlocking said steering column to said steering wheel and concealed by said casing, and means above said steering wheel for locking or unlocking said means in its respective positions, a stationary member within said casing for supporting said locking means above the steering wheel, and means above steering wheel for controlling the ignition adapted to be locked simultaneously with the rendering of the steering wheel inoperative.

7. In combination, in a steering wheel and a steering column means associated therewith for locking and unlocking said steering column to said steering wheel and means for freely supporting said steering wheel when unlocked from the steering column, yielding means mounted above said steering wheel for normally locking said steering wheel and steering column to one another; an ignition control means, a control box mounted above said steering wheel containing locking mechanism adapted to simultaneously actuate the means for locking the steering wheel and steering column to one another and to lock an ignition control in said box.

8. In combination, a steering wheel, a steering column carrying therewith a tubular member and a locking ring, a locking ring, means on said steering wheel for actuating the said locking ring to lock it to the steering column, a stationary member associated therewith supporting above the steering wheel a control box, a collar above said steering wheel on the tubular member located beneath the control box, yielding means to move said tubular member to its uppermost position, to lock the steering wheel and steering column to one another, a plunger in said control box adapted to depress said tubular member, an ignition control member in said box, a lock adapted to actuate said plunger and lock it in its depressed position, a locking member having one end engaging a lock and the other end the ignition control member whereby, in the position for unlocking the steering wheel from the steering column, the ignition segment will be locked when in its off position.

In testimony whereof I affix my signature.

LOUIS R. RUTHENBURG.